(12) United States Patent
Niguchi et al.

(10) Patent No.: US 12,119,770 B2
(45) Date of Patent: Oct. 15, 2024

(54) MOTOR APPARATUS AND METHOD FOR DRIVING MOTOR APPARATUS

(71) Applicants: OSAKA UNIVERSITY, Suita (JP); KABUSHIKI KAISHA A.H.MOTORLAB, Nakatsugawa (JP)

(72) Inventors: Noboru Niguchi, Suita (JP); Nozomu Takemura, Nakatsugawa (JP)

(73) Assignees: OSAKA UNIVERSITY, Suita (JP); KABUSHIKI KAISHA A.H.MOTORLAB, Nakatsugawa (JP)

( * ) Notice: Subject to any disclaimer, the term of this patent is extended or adjusted under 35 U.S.C. 154(b) by 0 days.

(21) Appl. No.: 18/573,102

(22) PCT Filed: Mar. 28, 2022

(86) PCT No.: PCT/JP2022/014834
§ 371 (c)(1),
(2) Date: Dec. 21, 2023

(87) PCT Pub. No.: WO2023/276368
PCT Pub. Date: Jan. 5, 2023

(65) Prior Publication Data
US 2024/0291418 A1    Aug. 29, 2024

(30) Foreign Application Priority Data

Jun. 30, 2021    (JP) .................................. 2021-108812

(51) Int. Cl.
*H02P 1/30* (2006.01)
*H02P 1/52* (2006.01)
*H02P 3/00* (2006.01)
*H02P 21/22* (2016.01)
*H02P 23/00* (2016.01)
*H02P 25/00* (2006.01)
*H02P 27/12* (2006.01)

(52) U.S. Cl.
CPC .............. *H02P 27/12* (2013.01); *H02P 21/22* (2016.02)

(58) Field of Classification Search
CPC ................................. H02P 27/12; H02P 21/22
USPC .................................................. 318/503, 811
See application file for complete search history.

(56) References Cited

U.S. PATENT DOCUMENTS

| 8,013,553 B2 * | 9/2011 | Taniguchi | ............... | B60L 1/003 |
| | | | | 318/400.41 |
| 2012/0049782 A1 * | 3/2012 | Suzuki | .................. | H02M 7/493 |
| | | | | 318/807 |
| 2021/0257947 A1 * | 8/2021 | Kinjo | .................... | H02M 7/493 |

FOREIGN PATENT DOCUMENTS

| CN | 101976999 B | 5/2012 |
| JP | 2008-154318 A | 7/2008 |
| JP | 2016-103957 A | 6/2016 |

\* cited by examiner

*Primary Examiner* — Erick D Glass
(74) *Attorney, Agent, or Firm* — Locke Lord LLP (57) ABSTRACT

A motor apparatus and a method for driving the motor apparatus capable of reducing the number of switches while individually controlling each phase of a switched reluctance motor having two systems of three-phase windings provided to one rotor.

17 Claims, 11 Drawing Sheets

PHASE CURRENT WAVEFORM

FIG.7

TORQUE WAVEFORM

MOTOR APPARATUS AND METHOD FOR DRIVING MOTOR APPARATUS

TECHNICAL FIELD

The present invention relates to a motor apparatus and a method for driving the motor apparatus, and more particularly, to a motor apparatus and a method for driving the motor apparatus having a switched reluctance motor that uses a ferromagnetic material as a rotor.

BACKGROUND ART

Conventionally, a three-phase motor that can control rotational speed by changing the frequency of an alternating current and provide a stable rotational speed is used as a power source in various technical fields. Further, a switched reluctance motor using a ferromagnetic material in a rotor has also been proposed. (See, e.g., Patent Document 1)

Figure 11:
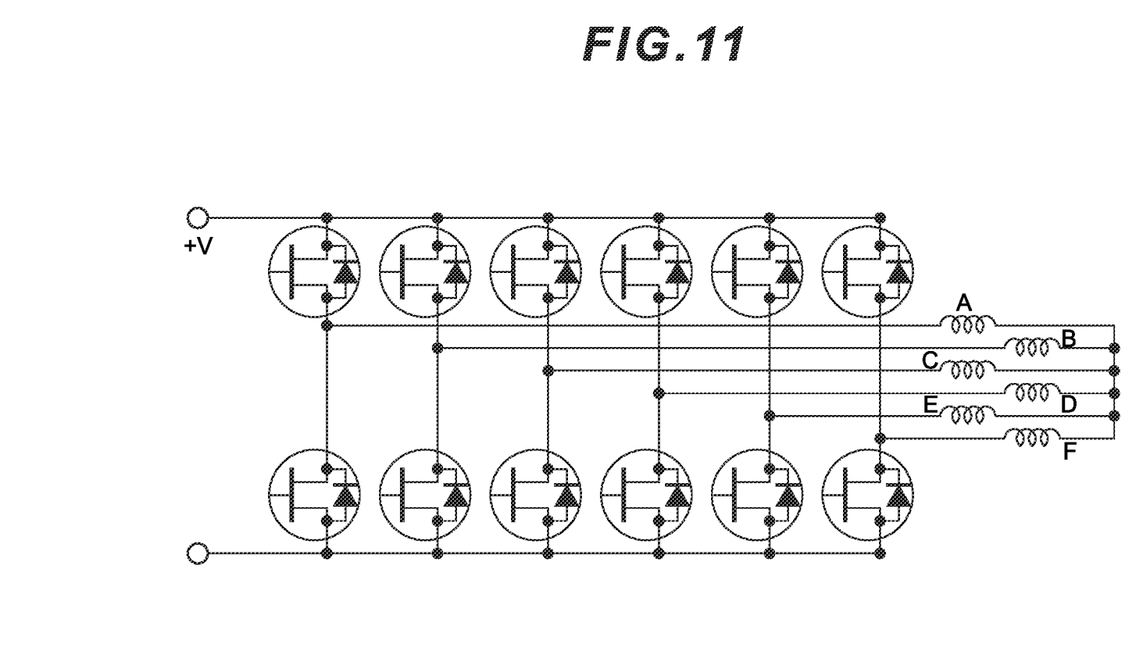
FIG. 11 is a circuit diagram schematically illustrating a drive circuit of a conventional motor apparatus having two systems of three-phase windings.

FIG. 11 is a circuit diagram illustrating a simplified drive circuit of a motor apparatus having two systems of conventional three-phase windings. The motor apparatus illustrated in FIG. 11 includes an A-phase coil, an E-phase coil, and a C-phase coil as a three-phase winding of a first system and a D-phase coil, a B-phase coil, an F-phase coil as a three-phase winding of a second system. Further, between the power supply voltage (+V) and the grounding voltage (0 V), an upper switch and a lower switch corresponding to each phase are connected in series to form a switch inverter, and six switch inverters are connected in parallel. Further, one end of the winding (coil) of each phase is connected between the upper switch and the lower switch of each switch inverter whereas the other end of the winding of each phase is connected to a neutral point.

In the motor apparatus illustrated in FIG. 11, three-phase vector control is performed in each of the first system and the second system while monitoring the current value flowing through the windings of each phase. Thereby, current can appropriately flow to the coils of each phase and the switched reluctance motor can be rotated.

RELATED ART DOCUMENTS

Patent Documents

Patent Document 1: Japanese Laid-Open Patent Publication No. 2016-103957

SUMMARY OF THE INVENTION

Problem to be Solved by the Invention

In the conventional motor apparatus illustrated in FIG. 11, because each of the three-phase winding of the two systems in each inverter can be individually controlled, complicated rotation control can be performed. However, 12 switches are required for using in inverters of 6 phases, and the number of switches included in the circuit is increased. The increase in the number of switches installed in the drive circuit result to problems such as an increase in the installing area of the circuit, an increase in the amount of heat generated, and an increase in cost. In addition, there is a problem of an increase in the probability of occurrence of switch failure in the entire circuit.

The present invention is provided in view of the above conventional problems and aims to provide a motor apparatus and a method for driving the motor apparatus that can individually control each phase of the switch reluctance motor having two systems of three-phase windings provided to one rotor while reducing the number of switches.

Means for Solving the Problem

In order to solve the above-mentioned problems, a motor apparatus according to an embodiment of the present invention has a motor unit including a rotor that is rotatably disposed about an axis of rotation and a stator having an inner periphery on which plural teeth parts are formed, a switch inverter unit configured to supply electric power to the motor unit, and a switch control unit configured to control each switch included in the switch inverter unit, wherein the rotor is formed of a ferromagnetic material and is a switched reluctance motor, wherein a three-phase winding of a first system and a three-phase winding of a second system are wound around the plural teeth parts, wherein the switch inverter unit includes three switch groups connected in parallel, each of which having an upper switch, a middle switch, and a lower switch that are connected in series between a first potential and a second potential, wherein the switch control unit has a vector control mode for sending a control signal to each of the first system and the second system of the switch inverter unit based on three-phase vector control.

With the motor apparatus according to an embodiment of the present invention, there is provided a switch inverter unit including three switch groups connected in parallel, each of which having an upper switch, a middle switch, and a lower switch that are connected in series. In the vector control mode, the switch inverter unit sends a control signal based on three-phase vector control to the first system and the second system, respectively. Thereby, the number of switches can be reduced while individually controlling each phase of the switched reluctance motor having two systems of three-phase windings provided to one rotor.

Further, according to one aspect of the present invention, an A-phase, an E-phase, and a C-phase are wound around the first system, and a D-phase, a B-phase, and an F-phase are wound around the second system, wherein the switch inverter unit includes a U-array switch group, V-array switch group, and W-array switch group that are connected in parallel, wherein the U-array switch group has a first upper switch, a first middle switch, and a first lower switch that are arranged in order from the first potential and connected in series, wherein the V-array switch group has a second upper switch, a second middle switch, and a second lower switch that are arranged in order from the first potential and connected in series, wherein the W-array switch group includes a third upper switch, a third middle switch, and a third lower switch that are arranged in order from the first potential and connected in series, wherein one end of the A-phase is connected between the first upper switch and the first middle switch, and one end of the D-phase is connected between the first middle switch and the first lower switch, wherein one end of the E-phase is connected between the second upper switch and the second middle switch, and one end of the B-phase is connected between the second middle switch and the second lower switch, and wherein one end of the C-phase is connected between the third upper switch and the third middle switch, and one end of the F-phase is connected between the third middle switch and the third lower switch.

Further, according to one aspect of the present invention, the A-phase, the B-phase, the C-phase, the D-phase, the E-phase, and the F-phase have another end connected to a neutral point to establish a star connection.

Further, according to one aspect of the present invention, the A-phase, the B-phase, the C-phase, the D-phase, the E-phase, and the F-phase are annularly connected in series to establish a hexagon connection.

Further, according to one aspect of the present invention, in a case of the vector control mode, the switch control unit is configured to generate a pulsed signal by comparing signal waves and carrier waves and perform modulation control on each of the switches by way of PWM (Pulse Width Modulation).

Further, according to one aspect of the present invention, the signal waves have same phases for the first system and the second system and have amplitudes that are offset from one another.

Further, according to one aspect of the present invention, the switch control unit has a pulse control mode for pulse-driving the first system and the second system, and wherein an off signal is sent to the middle switch, the first system is pulse-driven by the upper switch, and the second system is pulse-driven by the lower switch.

Further, according to one aspect of the present invention, a ratio between the number of poles P of the rotor and the number of slots S of the teeth part is P:S=5:6.

In order to solve the above-mentioned problems, there is provided a method for driving a motor apparatus that rotates by an output from an inverter switch unit having first and second systems of three-phase windings provided to one rotor, the rotor being formed of a ferromagnetic material and being a switched reluctance motor. The method includes a current value acquisition step that acquires an electric current value of each phase of the first and second systems, a command voltage calculation step that calculates a first command voltage with respect to the first system and a second command voltage with respect to the second system based on the electric current value of each phase, a gate signal determination step that determines a gate signal with respect to the first system and the second system by comparing a voltage of a carrier wave with the first command voltage and the second command voltage, an inverter switch control step that determines an on signal/off signal of the inverter switch unit based on the gate signal.

Effects of the Invention

According to an embodiment of the present invention, there is provided a motor apparatus and a method for driving the motor apparatus that can reduce the number of switches while individually controlling each phase of a switched reluctance motor having two systems of three-phase windings provided to one rotor.

BRIEF DESCRIPTION OF THE DRAWINGS

FIG. 1 is a drawing illustrating an outline of a motor apparatus according to the first embodiment in which FIG. 1 (a) is a circuit diagram illustrating a configuration of a switch inverter unit and FIG. 1 (b) is a schematic diagram illustrating an example of a structure of motor unit.

FIG. 4 is a graph for explaining a signal wave and a carrier wave of U1 phase and U2 phase according to the first embodiment in which FIG. 4 (a) illustrates a U1 phase, FIG. 4 (b) illustrates a U2 phase, and FIG. 4 (c) illustrates a result of superimposing the U1 phase and the U2 phase.

FIG. 5 is a graph illustrating a comparison result between a signal wave and a carrier wave according to the first embodiment in which FIG. 5 (a) illustrates the waveforms of a signal wave and a carrier wave of a U1 phase and a U2 phase, FIG. 5 (b) illustrates a result of comparing a U1 phase and a U2 phase, and FIG. 5 (c) illustrates a control signal input to each switch.

MODES FOR CARRYING OUT THE INVENTION

First Embodiment

Figure 1A:
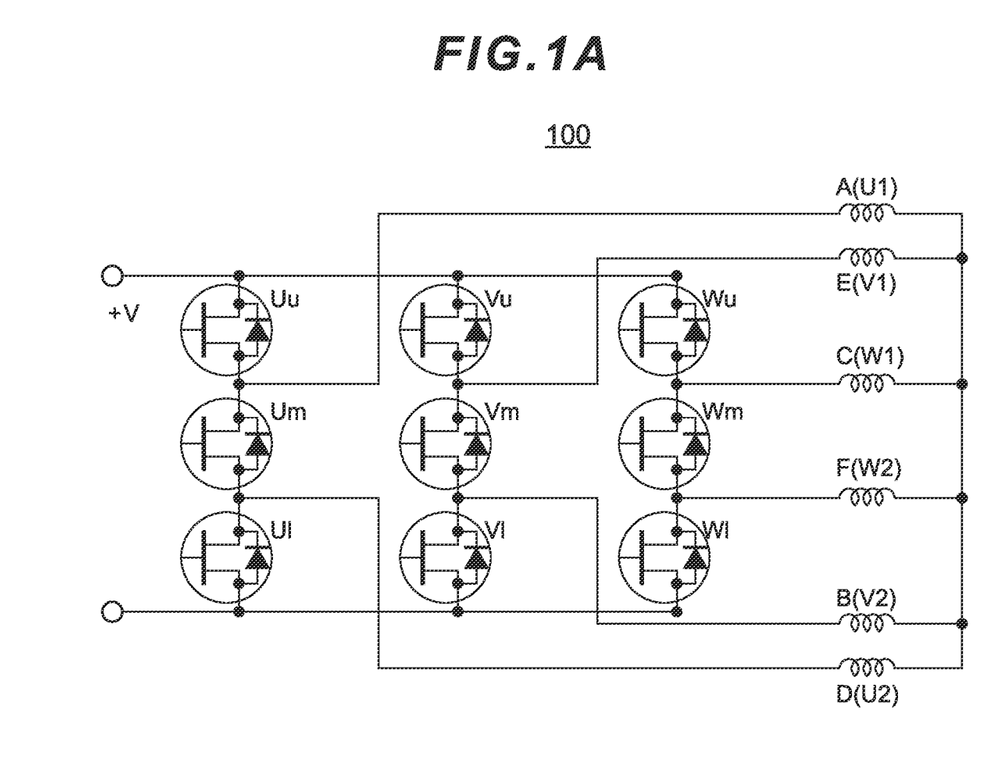
Figure 1B:
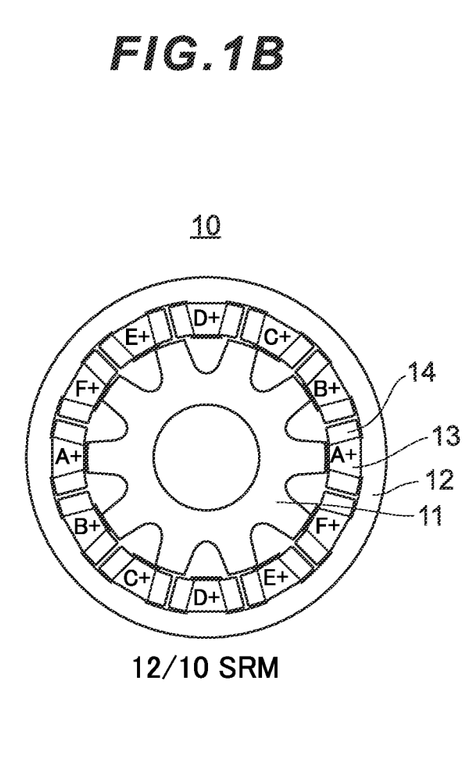

Hereinafter, embodiments of the present invention will be described in detail with reference to the drawings. The same or equivalent components, members, and processes illustrated in the respective drawings are denoted by the same reference numerals, and duplicate descriptions are omitted as appropriate. FIG. 1 is a drawing illustrating an outline of a motor apparatus according to the first embodiment in which FIG. 1 (a) is a circuit diagram illustrating a configuration of a switch inverter unit and FIG. 1 (b) is a schematic diagram illustrating an example of a structure of motor unit.

As illustrated in FIG. 1 (a), the switch inverter unit of the present embodiment has three switch groups (U-array switch group, V-array switch group, W-array switch group) connected in parallel between the power supply voltage (+V) and the grounding voltage (0V). Each switch group includes three switches connected in series. A total of nine of the switches constitute the switch inverter unit. Each switch has its drain connected to the power supply voltage side (upstream side) and its source connected to the ground voltage side (downstream side). Further, in a case of using a MOSFET (Metal-Oxide-Semiconductor Field Effect Transistor) for each switch, it becomes an equivalent circuit that has parasitic diodes inversely connected in parallel between the source and the drain.

Further, the motor unit includes three-phase windings of the first and second systems. The three-phase-windings of the first system are formed of three windings (coils) including an A-phase winding, an E-phase winding, and a C-phase winding. The three-phase windings of the second system are formed of three windings including a D-phase winding, a B-phase winding, and an F-phase winding. Here, in the vector control mode for vector control of the three-phase windings, each of a U1 phase, a V1 phase, and a W1 phase of the first system is assumed to be the current flowing through the A-phase winding, the E-phase winding, and the C-phase winding, respectively. Further, each of a U2 phase, a V2 phase, and a W2 phase is assumed to be the current flowing through the D-phase winding, the B-phase winding, and the F-phase winding, respectively.

The U-array switch group has an upper switch Uu, a middle switch Um, and a lower switch Ul that are arranged in order from the power supply voltage side and connected in series. Further, one end of the A-phase winding is connected between the upper switch Uu and the middle switch Um. Further, one end of the D-phase winding is connected between the middle switch Um and the lower switch Ul. Here, each of the upper switch Uu, the middle switch Um, and the lower switch Ul corresponds to a first upper switch, a first middle switch, and a first lower switch according to an embodiment of the present invention.

The V-array switch group has an upper switch Vu, a middle switch Vm, and a lower switch Vl that are arranged in order from the power supply voltage side and connected in series. Further, one end of the E-phase winding is connected between the upper switch Vu and the middle switch Vm. Further, one end of the B-phase winding is connected between the middle switch Vm and the lower switch Vl. Here, each of the upper switch Vu, the middle switch Vm, and the lower switch Vl corresponds to a second upper switch, a second middle switch, and a second lower switch according to an embodiment of the present invention.

The W array switch group has an upper switch Wu, a middle switch Wm, and a lower switch Wl that are arranged in order from the power supply voltage side and connected in series. Further, one end of the C-phase winding is connected between the upper switch Wu and the middle switch Wm. Further, one end of the F-phase winding is connected between the middle switch Wm and the lower switch Wl. Here, each of the upper switch Wu, the middle switch Wm, and the lower switch Wl corresponds to the second upper switch, the second middle switch, and the second lower switch according to an embodiment of the present invention.

Further, as illustrated in FIG. 1 (a), the other end of each of the A-phase winding, the E-phase winding, the C-phase winding, the D-phase winding, the B-phase winding, and the F-phase winding is connected to a common neutral point to establish a star connection. Further, the operation of each switch is controlled by a switch control unit (not illustrated).

As illustrated in FIG. 1 (b), the motor unit 10 includes a rotor 11 and a stator 12 disposed around the rotor 11. Further, rotor teeth formed of a ferromagnetic material are disposed along the outer periphery of the rotor 11. Further, the stator 12 has a core back portion and plural teeth parts 13 formed protruding toward its inner periphery. Further, a winding (coil) 14 is wound around each tooth part 13, to thereby form the above-described three-phase winding of the first system including the A-phase winding, the E-phase winding, and the C-phase winding, and the three-phase winding of the second system including the D-phase winding, the B-phase winding, and the F-phase winding.

The core back portion is a portion disposed at the outer side of the rotor 11 in a manner circumferentially encompassing the outer periphery of the rotor 11. The core back portion has plural teeth parts 13 that are formed to protrude at its inner periphery and arranged at equal intervals. A known core back portion may be used as the core back portion, and the material and the structure that form the core back portion are not limited in particular. Further, a component such as a separate motor housing may be provided further toward the outer periphery from the core back portion.

The teeth parts 13 are protrusion-like parts formed to protrude toward the rotor 11 from the inner peripheral surface of the core back portion. Each teeth part 13 is arranged at equal intervals and formed in the same length and shape. A space is provided in between each of the teeth parts 13 to serve as a slot. The winding 14 is wound about each teeth part 13 and the slot. A magnetic field is created in the teeth part 13 by allowing electric current to flow in the winding 14.

Here, the A-phase winding, the E-phase winding and the C-phase winding are arranged with a difference of ⅓ period, respectively, so as to constitute the three-phase winding of the first system. Similarly, the D-phase winding, the B-phase winding, and the F-phase winding are also arranged with a difference of ⅓ period, respectively, so as to constitute the three-phase winding of the second system. FIG. 1 (b) illustrates an example of a 10-pole/12-slot switched reluctance motor that includes the rotor 11 having 10 rotor teeth and the stator 12 having 12 teeth parts 13. Although the number of poles P and the number of slots S of the motor unit are not limited to 10 poles and 12 slots, the ratio of the number of poles and slots is P:S=5:6. Further, the winding method of each phase to the teeth part 13 is not limited to concentrated winding and may alternatively be distributed winding.

Figure 2:
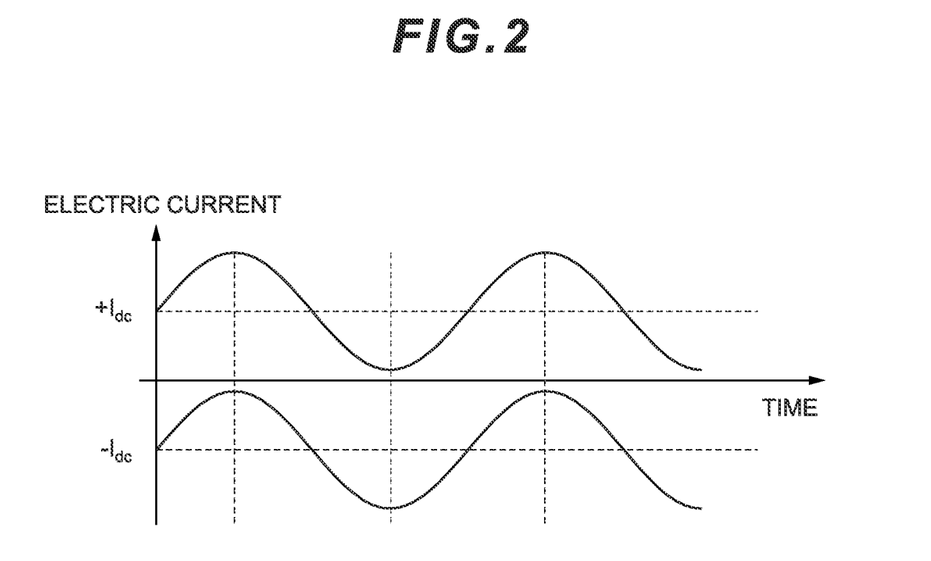
FIG. 2 is a graph illustrating a target waveform of a current flowing through a U1 phase of a first system (A-phase) and a U2 phase of a second system (D-phase).

FIG. 2 is a graph illustrating target waveforms of electric currents flowing through a U1 phase of the first system (A-phase) and a U2 phase of the second system (D-phase). As illustrated in FIG. 2, the current flowing through the U1 phase and the current flowing through the U2 phase are sine waves of the same phase. The U1 phase is offset by $+I_{dc}$ in the positive direction, and the U2 phase is offset by $-I_{dc}$ in the negative direction. Therefore, the sum of the current value of the U1 phase and the current value of the U2 phase is constantly 0. Here, although only the U1 and U2 phases are illustrated, the same applies to the V1 and V2 phases, and the W1 and W2 phases. Further, as described above, the three-phase windings of the first system and the second system are driven by three-phase alternating current, respectively, the phase of each of the phases has a difference of ⅓ period, and the three-phase windings of the first system and the second system are connected to a common neutral point. Therefore, the sum of the current values of the U1 phase, the V1 phase, and the W1 phase and the sum of the current values of the U2 phase, the V2 phase, and the W2 phase is 0, respectively.

Figure 3:
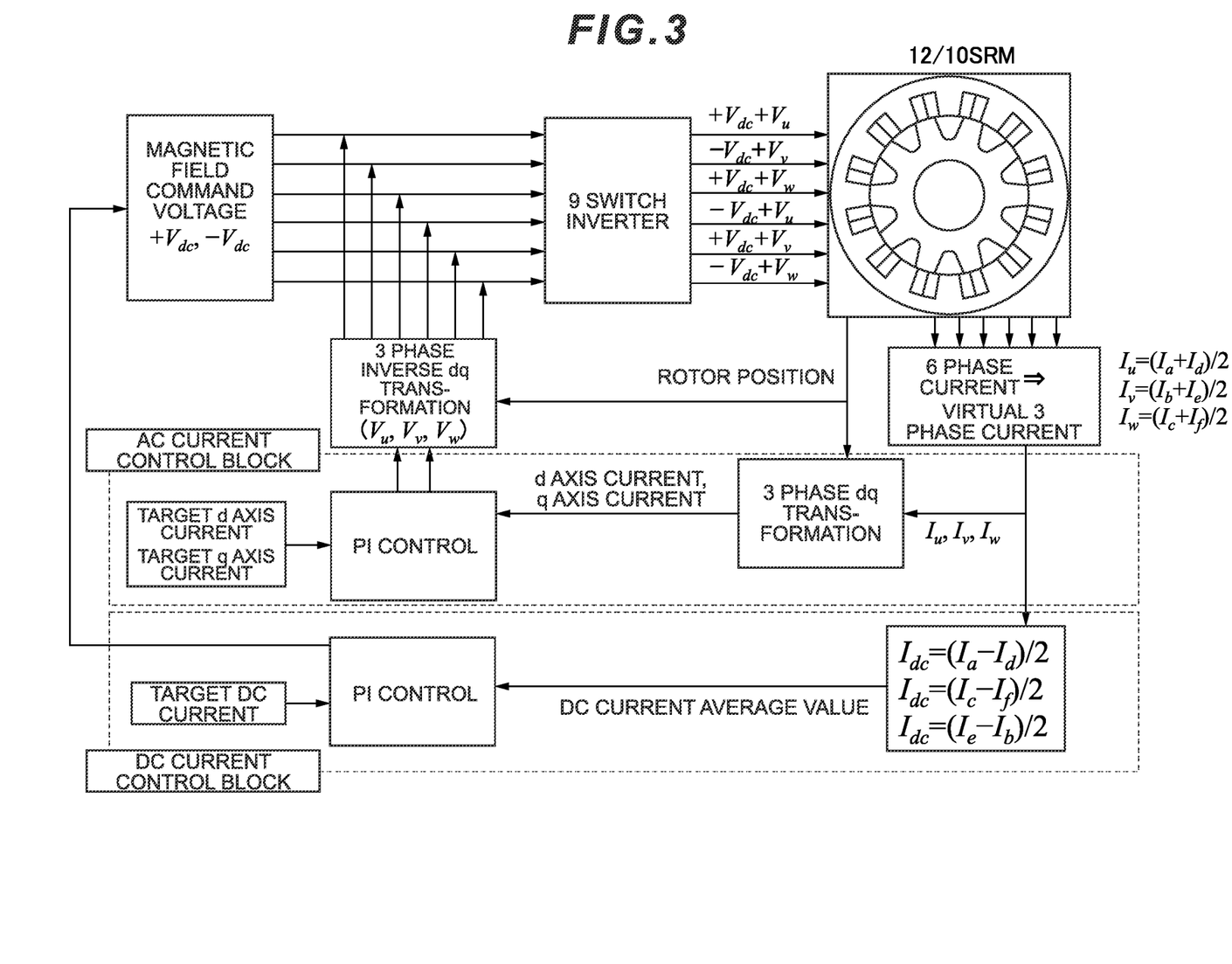
FIG. 3 is a schematic diagram for explaining a method for controlling the driving of a motor apparatus according to the first embodiment.

FIG. 3 is a schematic diagram for explaining a method for controlling the driving of a motor apparatus according to the present embodiment. As illustrated in the drawing, when driving the motor apparatus, each driving current $i_a$, $i_b$, $i_c$, $i_d$, $i_e$, $i_f$ flowing through the A-phase winding, the B-phase winding, the C-phase winding, the D-phase winding, the E-phase winding, and the F-phase winding of the motor unit 10 is monitored (current value acquisition step). Based on the acquired driving currents of the six phases, the average phase currents $i_u$, $i_v$, $i_w$ of the first and second systems are obtained as virtual three-phase currents.

Next, in the AC current control block, the obtained virtual three-phase currents $i_u$, $i_v$, $i_w$ are transformed into a rotating coordinate system by way of three-phase dq transformation, so that a d-axis current $i_d$ and a q-axis current $i_q$ are obtained. Then, PI control is performed using the obtained currents $i_d$, $i_q$ as input values. Thereby, voltage values $v_d$, $v_q$ are obtained for current control or rotational velocity control. Because the obtained voltage values $v_d$, $v_q$ are expressed in the rotating coordinate system, AC command voltages $V_u$, $V_v$, $V_w$ are obtained by performing a three-phase inverse dq transformation on the obtained voltage values $v_d$, $v_q$. The obtained command voltages Vu, Vv, Vw, become the AC (alternating current) components in the signal waves of the U1 phase and the U2 phase, the V1 phase and the V2 phase, and the W1 phase and the W2 phase that periodically change, respectively.

Further, in the DC current control block, $(i_a-i_d)/2$, $(i_c-i_f)/2$, $(i_e-i_b)/2$ are calculated from the 6 phase driving currents to serve as the DC current average values that offset the current value $I_{dc}$ of the first system and the second system, respectively. Next, PI control is performed using the obtained DC current average value $I_{dc}$ as the input value to obtain the DC command voltages $+V_{dc}$ and $-V_{dc}$ as the DC (direct current) components in the signal waves corresponding to the offset currents of the first and second system.

Next, command voltages $(V_u+V_{dc})$, $(V_v+V_{dc})$, $(V_w+V_{dc})$ of the U1 phase, the V1 phase, and the W1 phase of the first system are obtained by adding the AC command voltages Vu, Vv, Vw to the DC command voltage $+V_{dc}$, respectively. Further, command voltages $(V_u-V_{dc})$, $(V_v-V_{dc})$, $(V_w-V_{dc})$ of the U2 phase, the V2 phase, and the W2 phase of the second system are obtained by adding the AC command voltages $V_u$, $V_v$, $V_w$ to the DC command voltage $-V_{dc}$, respectively. The temporal changes of the obtained command voltages constitute signal waves (command voltage calculation step).

Next, the gate signal to the first system and the second system is determined by comparing the magnitude relation between the obtained signal wave and the carrier wave of each phase. The gate signal is determined as a High signal when the signal wave is larger than the carrier wave and as a Low signal when the signal wave is smaller than the carrier wave (gate signal determination step).

Next, the input signal to the switch inverter unit composed of a 9-switch inverter (inverter switch control step) is controlled based on the determined gate signal (High signal and Low signal). Specifically, as illustrated in Table 1, the on/off of the upper switch, the middle switch, and the lower switch are controlled according to the combination of the High signal and the Low signal of the first system and the second system. Although a case of the U-phase is only described in Table 1 and the following drawings, similar controls are also performed in a case of the V-phase and the W-phase.

TABLE 1

| PATTERN | U1 PHASE | U2 PHASE | Uu | Um | Ul |
|---|---|---|---|---|---|
| 1 | High | High | ON | ON | OFF |
| 2 | Low | Low | OFF | ON | ON |
| 3 | High | Low | ON | OFF | ON |
| 4 | Low | High | ON | OFF | ON |

As illustrated in Table 1, in a case where the U1 phase and the U2 phase are both High signals (pattern 1), an ON signal is input to the gate of the upper switch Uu, an ON signal is input to the gate of the middle switch Um, and an OFF signal is input to the gate of the lower switch Ul. In a case where the U1 phase and the U2 phase are both Low signals (pattern 2), an OFF signal is input to the gate of the upper switch Uu, an ON signal is input to the gate of the middle switch Um, and an ON signal is input to the gate of the lower switch Ul.

In pattern 1, the upper switch Uu is turned on, the middle switch Um is turned on, and the lower switch Ul is turned off. Therefore, the potential Uum between the upper switch Uu and the middle switch Um results in a voltage drop from the power supply voltage (+V) by the forward voltage of the upper switch Uu, and the potential Uum is applied to the A-phase winding of the U1 phase. Further, the potential Uml between the middle switch Um and the lower-switch Ul results in a voltage drop from the power supply voltage (+V) by the forward voltages of the upper switch Uu and the middle switch Um, and the potential Uml is applied to the D-phase winding of the U2 phase.

In pattern 2, the upper switch Uu is turned off, the middle switch Um is turned on, and the lower switch Ul is turned on. Therefore, the potential Uum becomes a higher voltage from the ground voltage (0) by the forward voltages of the middle switch Um and the lower switch Ul and is applied to the A-phase winding of the U1 phase. Further, the potential Uml becomes a higher voltage from the ground voltage (0) by the forward voltage of the lower-switch Ul and is applied to the D-phase winding of the U2 phase.

In both cases where the U1 phase is a High signal and the U2 phase is a Low signal (pattern 3) and where the U1 phase is a Low signal and the U2 phase is a High signal (pattern 4), an ON signal is input to the gate of the upper switch Uu, an OFF signal is input to the gate of the middle switch Um, and an ON signal is input to the gate of the lower switch Ul.

In the patterns 3 and 4, the upper switch Uu is turned on, the middle switch Um is turned off, and the lower switch Ul is turned on. Therefore, the potential Uum results in a voltage drop from the power supply voltage (+V) by the forward voltage of the upper switching Uu, and the potential Uum is applied to the A-phase winding of the U1 phase. Further, the potential Uml becomes a higher voltage from the ground voltage (0) by the forward voltage of the lower switch Ul and is applied to the D-phase winding of the U2 phase. Although the signals applied to the switches become the same in patterns 3 and 4, the turning on of the U array upper switch Uu when the U1 phase is a Low signal would not be a problem because electric current is generated by the potential difference of the respective systems.

Figure 4A:
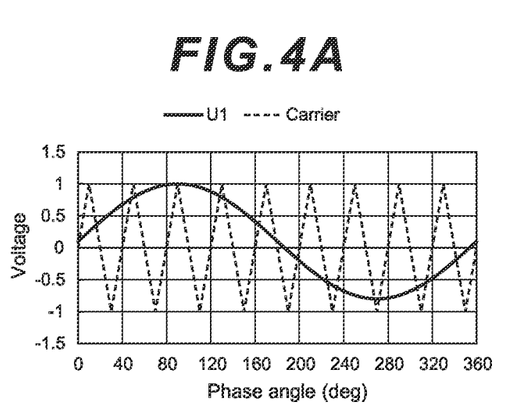
Figure 4B:
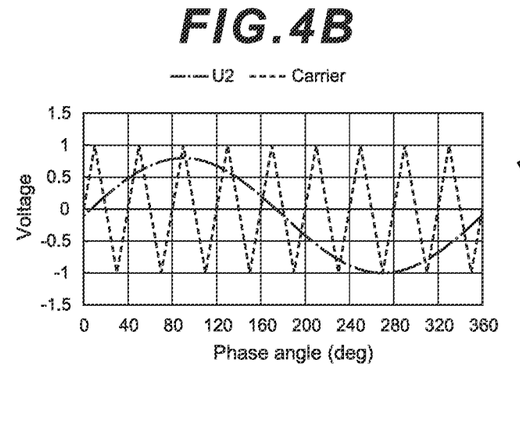
Figure 4C:
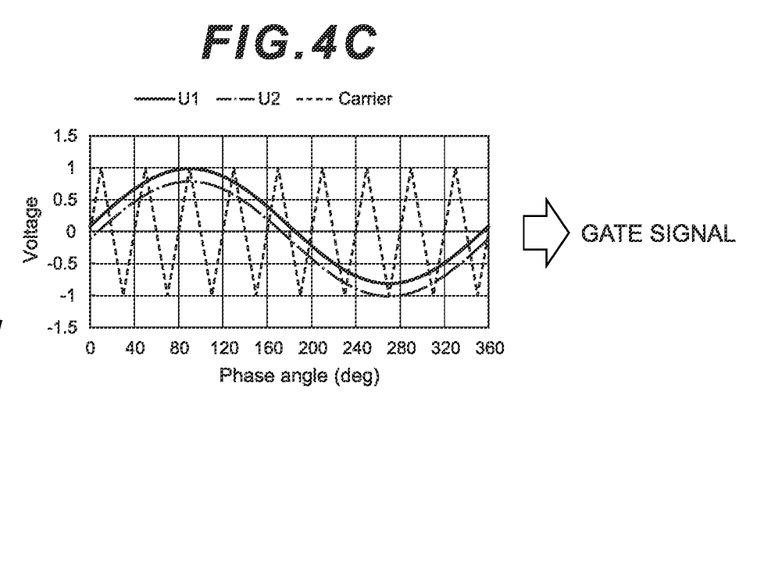

FIG. 4 is a graph for explaining a signal wave and a carrier wave of a U1 phase and a U2 phase according to the present embodiment in which FIG. 4 (a) illustrates the U1 phase, FIG. 4 (b) illustrates the U2 phase, and FIG. 4 (c) illustrates a result of superimposing the U1 phase and the U2 phase. In FIGS. 4(a) to 4(c), the horizontal axis represents the phase angle and the vertical axis represents the electric voltage. Here, although ±1V is illustrated as the maximum value and the minimum value of the voltage, this is merely a standardized expression used for the sake of convenience, and the actual voltage values are not to be limited in particular. In addition, the dashed line in the graph represents the signal waveform of the carrier wave. Here, a triangular wave is used. The solid line in FIG. 4 (a) represents the waveform of the signal wave of the U1 phase to illustrate the changes of the command voltage $(V_u+V_{dc})$. Further, the one-dot chain line in FIG. 4 (b) represents the waveform of the signal wave of the U2 phase to illustrate the changes of the command voltage $(V_u-V_{dc})$. In FIG. 4, the carrier wave is illustrated having a low frequency and a long cycle for the sake of convenience. However, a high-frequency carrier wave of approximately 5 kHz to 15 kHz is used in the actual motor apparatus.

In the present embodiment, because the command voltages are set to be the same by averaging the phase currents of the first system and the second system as illustrated in FIG. 3, the signal waves of the U1 phase and the U2 phase illustrated in FIG. 4 (a)-FIG. 4 (c) are of the same amplitude and phase and are offset in the positive and negative directions with respect to each other. As described above, the controlling of the inverter switch unit is performed as illustrated in Table 1 based on the magnitude relation between the carrier wave and the signal waves of the U1, U2 phases illustrated in FIG. 4(c).

Figure 5A:
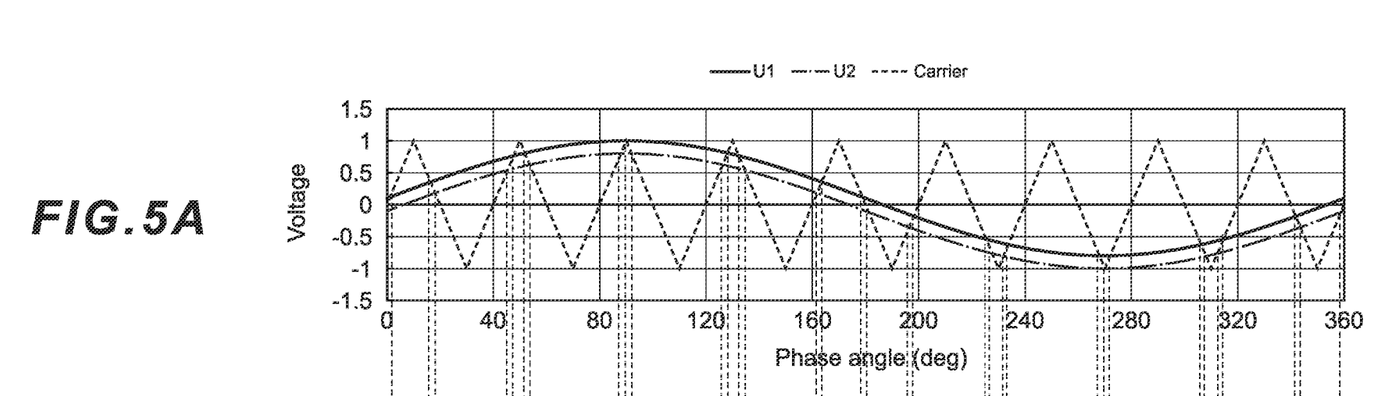
Figures 5B, 5C:
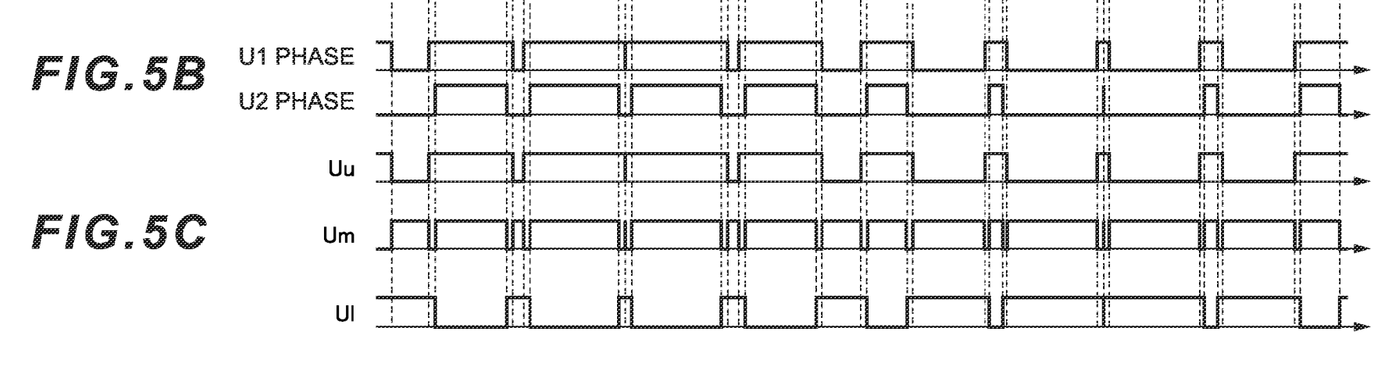

FIG. 5 is a graph showing a comparison result between the signal wave and the carrier wave according to the present embodiment in which FIG. 5 (a) illustrates the waveforms of a signal wave and a carrier wave of the U1 phase and the U2 phase, FIG. 5 (b) illustrates a comparison result between the U1 phase and the U2 phase, and FIG. 5 (c) illustrates the control signals input to each of the switches. In FIG. 5 (a), the horizontal axis represents the phase angle, and the vertical axis represents the voltage. In FIG. 5 (b), the horizontal axis represents the same phase angle as that of FIG. 5 (a), the position on the axis of the horizontal axis illustrates a Low signal, and the position away from the horizontal axis illustrates a High signal. In FIG. 5 (c), the horizontal axis represents the same phase angle as that of FIG. 5 (a), the position on the axis of the horizontal axis illustrates an off signal, and the position away from the horizontal axis illustrates an on signal. Further, the thin dashed lines drawn vertically across FIG. 5 (a) through FIG. 5 (c) indicate the intersection between the carrier waves and the signal waves in FIG. 5 (a).

In the present embodiment, the command voltages in the first system and the second system are offset from each other, and the signal wave of the U1 phase and the signal wave of the U2 phase exhibit a voltage difference as illustrated in FIG. 5 (a) and FIG. 5 (b). Accordingly, the intersections of the carrier wave and the signal wave are different for the U1 phase and the U2 phase, the High signal of the U2 phase is in the High signal period of the U1 phase at all times, and the High signal period of the U2 phase is shorter than that of the U1 phase. Further, because the switching timings of the High signal and the Low signal of the U1 phase and the U2 phase are different, on and off signals of the upper switch Uu, the middle switch Um, and the lower switch Ul are selected based on pattern 1 to pattern 3 illustrated in Table 1. That is, the switch control unit generates a pulsed signal by comparing the signal wave and the carrier wave and performs PWM (Pulse Width Modulation) modulation controls on each of switches.

Figure 6:
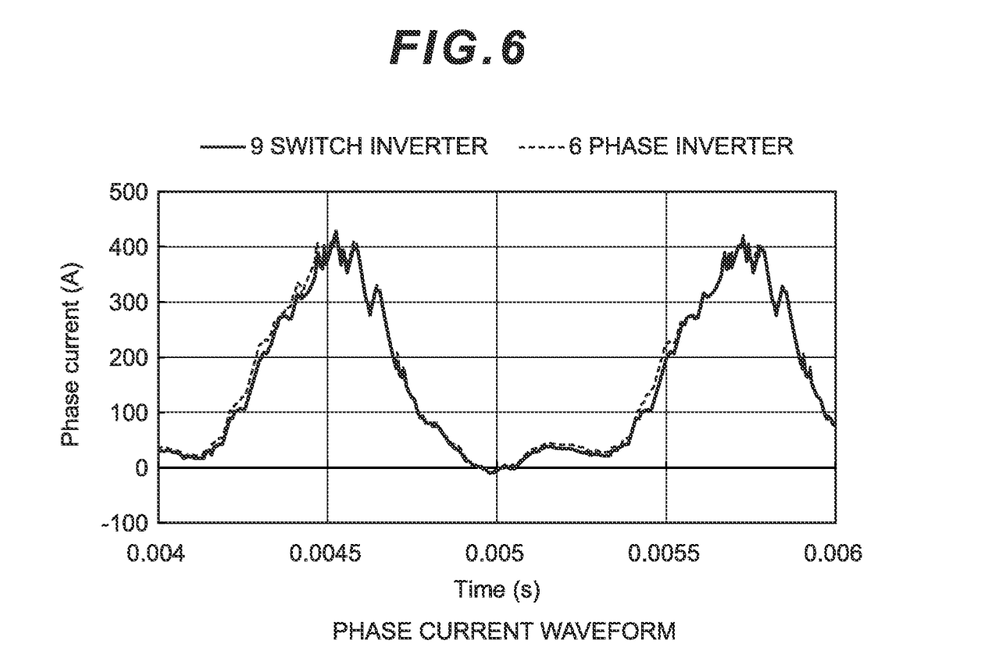
FIG. 6 is a graph illustrating a result of simulating a phase current wave form of a U1 phase.

Next, coupled analysis with an electric circuit was performed by way of simulation using a finite element method. FIG. 6 is a graph illustrating a result of simulating a phase current waveform of the U1 phase. The horizontal axis of FIG. 6 represents the time (seconds) and the vertical axis represents the current value (A) flowing through the U1 phase. With respect to the phase current waveform in the graph, the solid line illustrates the results in a case of using the 9-switch inverter of the present embodiment and the broken line illustrates the results in a case of using a 6-phase inverter (12 switches) of a conventional art. It can be understood from FIG. 6 that the target waveform illustrated in FIG. 2 can be supplied even if the 9-switch inverter illustrated in FIG. 1 is used and that the switched reluctance motor can be driven to rotate in a similar manner as the conventional art.

Figure 7:
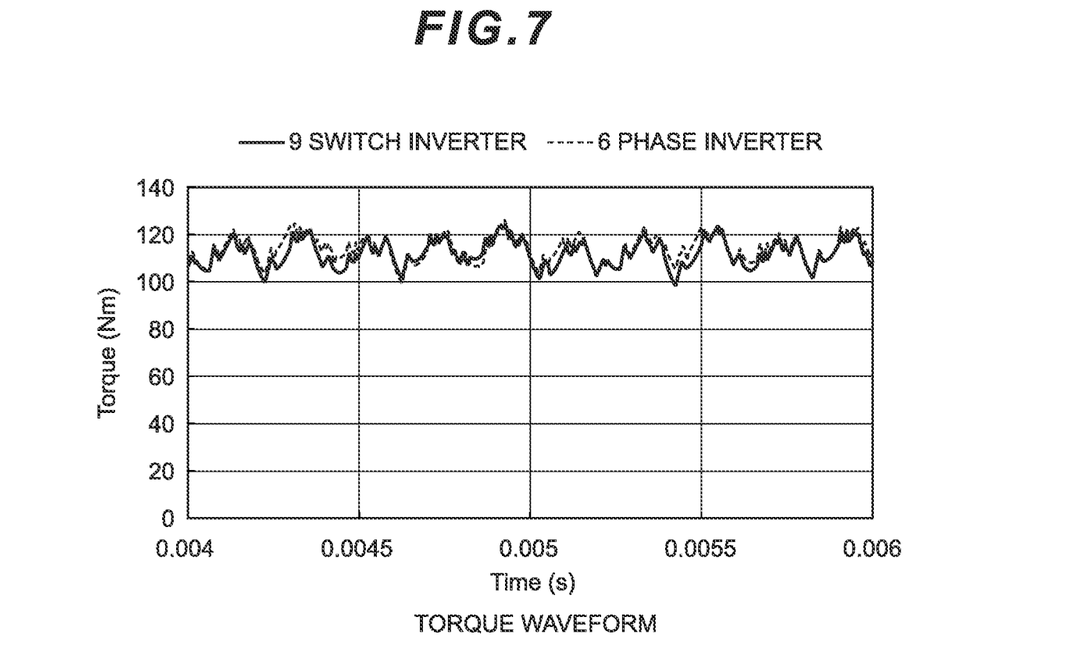
FIG. 7 is a graph illustrating a result of simulating a torque waveform of a motor apparatus.

FIG. 7 is a graph illustrating a result of simulating a torque waveform of the motor apparatus. The horizontal axis of FIG. 7 represents the time (seconds) and the vertical axis represents the torque (Nm). In the graph, the solid line illustrates the results in a case of using the 9-switch inverter of the present embodiment and the broken line illustrates the results in a case of using a 6-phase inverter (12 switches) of the conventional art. It can be seen from FIG. 7 that the torque can be continuously output by rotating the switched reluctance motor in a similar manner as the conventional art even if the 9-switch inverter illustrated in FIG. 1.

As described above, the motor apparatus of the present embodiment is provided with a switch inverter unit including three switch groups connected in parallel, each of which having an upper switch, a middle switch, and a lower switch that are connected in series. In the vector control mode, the switch inverter unit sends a control signal based on three-phase vector control to the first system and the second system, respectively. Thereby, the number of switches can be reduced while individually controlling each phase of the switched reluctance motor having two systems of three-phase windings provided to one rotor.

Further, the on/off signal of the inverter switch unit is determined based on a gate signal by acquiring the current value in each phase of the first system and the second system, calculating the command voltage for each system based on the current value of each phase, and determining the gate signal according to the comparison between the command voltage and the voltage of the carrier wave. Thereby, with the 9-switch inverter, the rotor 11 can be rotated by obtaining the pulse to be applied to the three-phase windings of the two systems and can be efficiently controlled from low speed to high speed according to the driving state.

Second Embodiment

Figure 8:
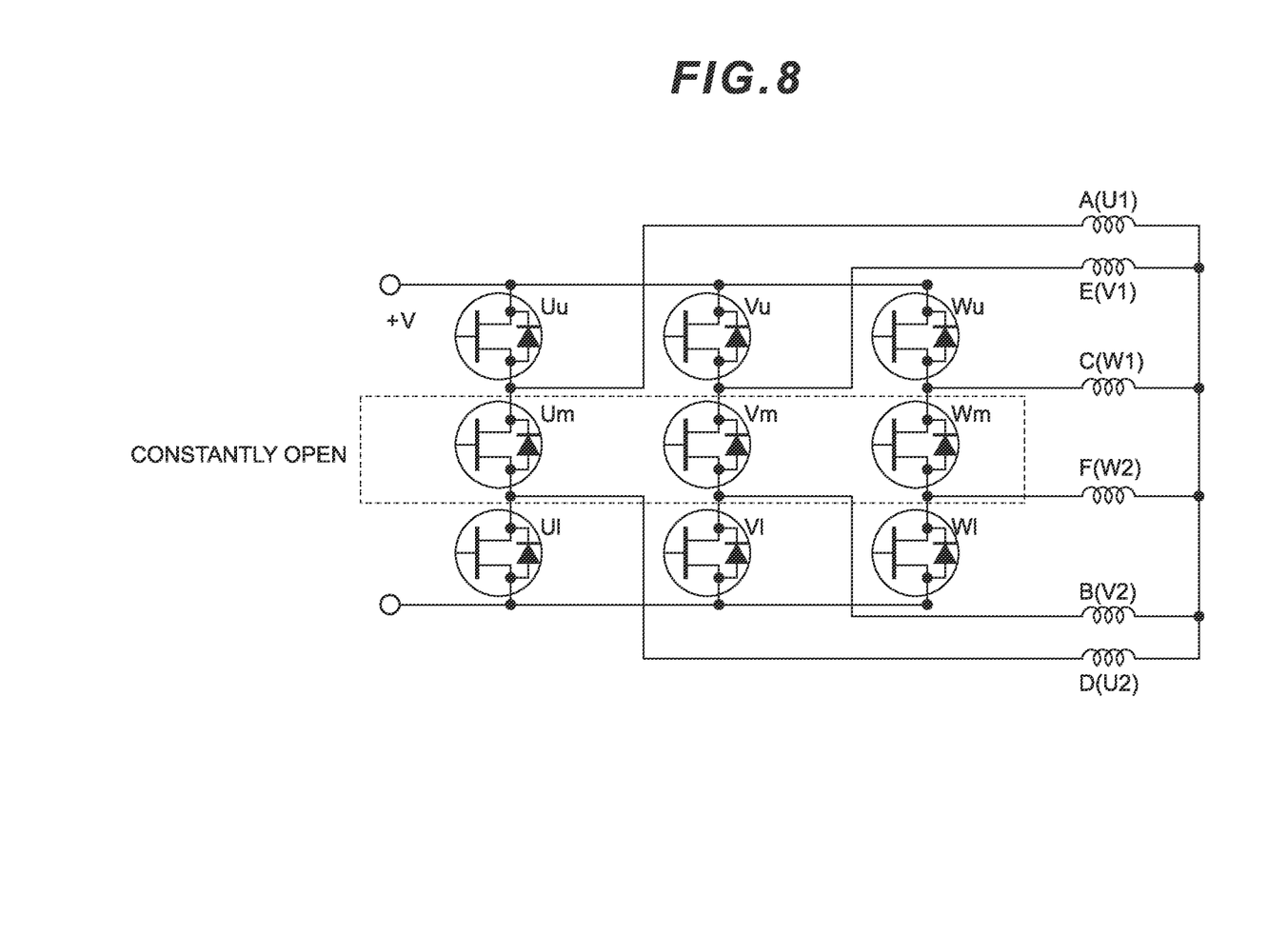
FIG. 8 is a circuit diagram illustrating a configuration of a switch inverter unit of a motor apparatus according to a second embodiment.
Figure 9:
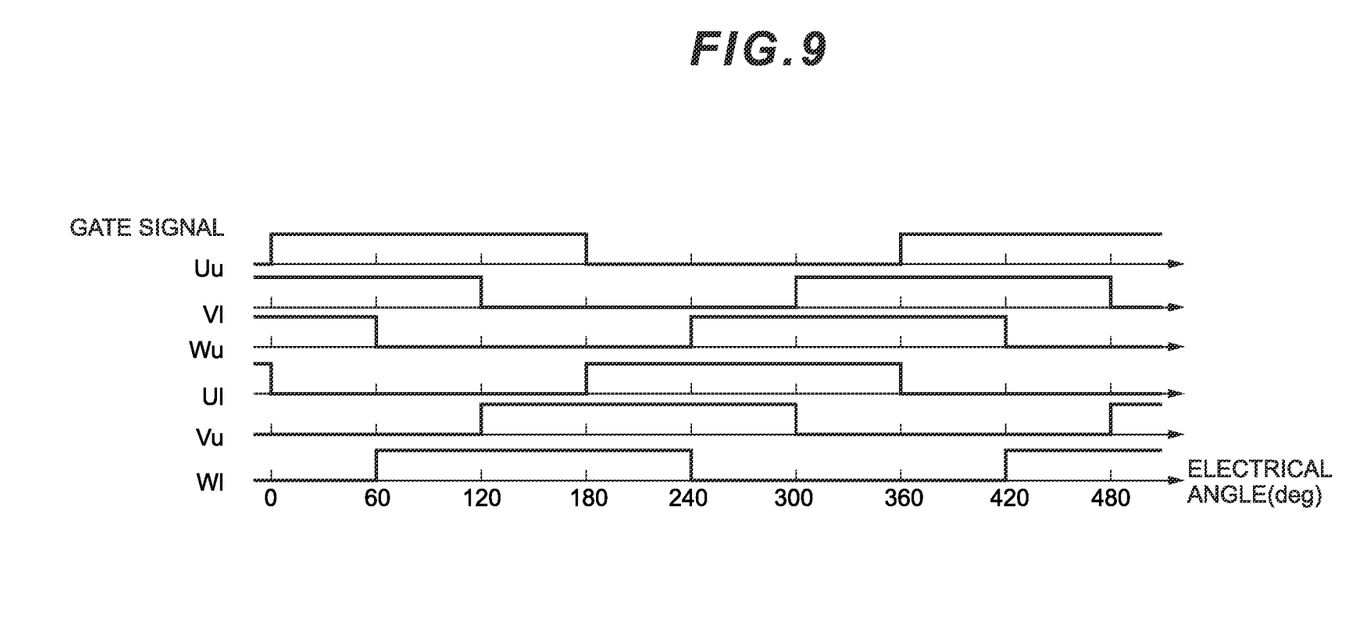
FIG. 9 is a timing chart illustrating a pulsed signal applied to each switch of a switch inverter unit according to a second embodiment.

Next, a second embodiment of the present invention will be described with reference to FIGS. 8 and 9. Details overlapping with the first embodiment will not be further described. The present embodiment is different from the first embodiment in that it further includes a pulse control mode for pulse-driving the first system and the second system. FIG. 8 is a circuit diagram illustrating a configuration of a switch inverter unit of a motor apparatus according to the present embodiment. FIG. 9 is a timing chart illustrating a pulsed signal applied to each switch of a switch inverter unit according to the present embodiment.

According to the present embodiment, the switch control unit supplies an off-signal to the middle switch Um of the U-array switch group, the middle switch Vm of the V-array switch group, and the middle switch Wm of the W-array switch group in a case where the switch control unit is in the pulse control mode. Thereby, the upper switch and the lower switch in each switch group are electrically separated by an interruption switch which is in an open state. Accordingly, with respect to the three-phase windings of the first system, the supplying of the electric current of the U1 phase, the V1 phase and the W1 phase is performed at the upper switch Uu, the upper switch Vu, and the upper switch Wu. Further, with respect to the three-phase windings of the second system, the supplying of the electric current of the U2 phase, the V2 phase, and the W2 phase is performed at the lower switch Ul, the lower switch Vl, and the lower switch Wl.

In the pulse control mode, the switch control unit outputs signals having phases that differ by ⅙ periods to the upper switch Uu, the lower switch Vl, the upper switch Wu, the lower switch Ul, the upper switch Vu, and the lower switch Wl as illustrated in FIG. 9. At this time, inverted signals are input to the upper and lower switches, respectively. As a result, electric current can appropriately flow through the coils of the respective phases, and the switched reluctance motor can be rotated.

As described above, the switch control unit of the present embodiment has a pulse control mode and sends an off signal to the middle switch for pulse-driving the first system with the upper-switch of each switch group and pulse-driving the second system with the lower-switch of each switch group. Thus, by switching between the vector control mode and the pulse control mode, an appropriate rotation drive can be selected in accordance with rotational speed and torque.

Third Embodiment

Figure 10:
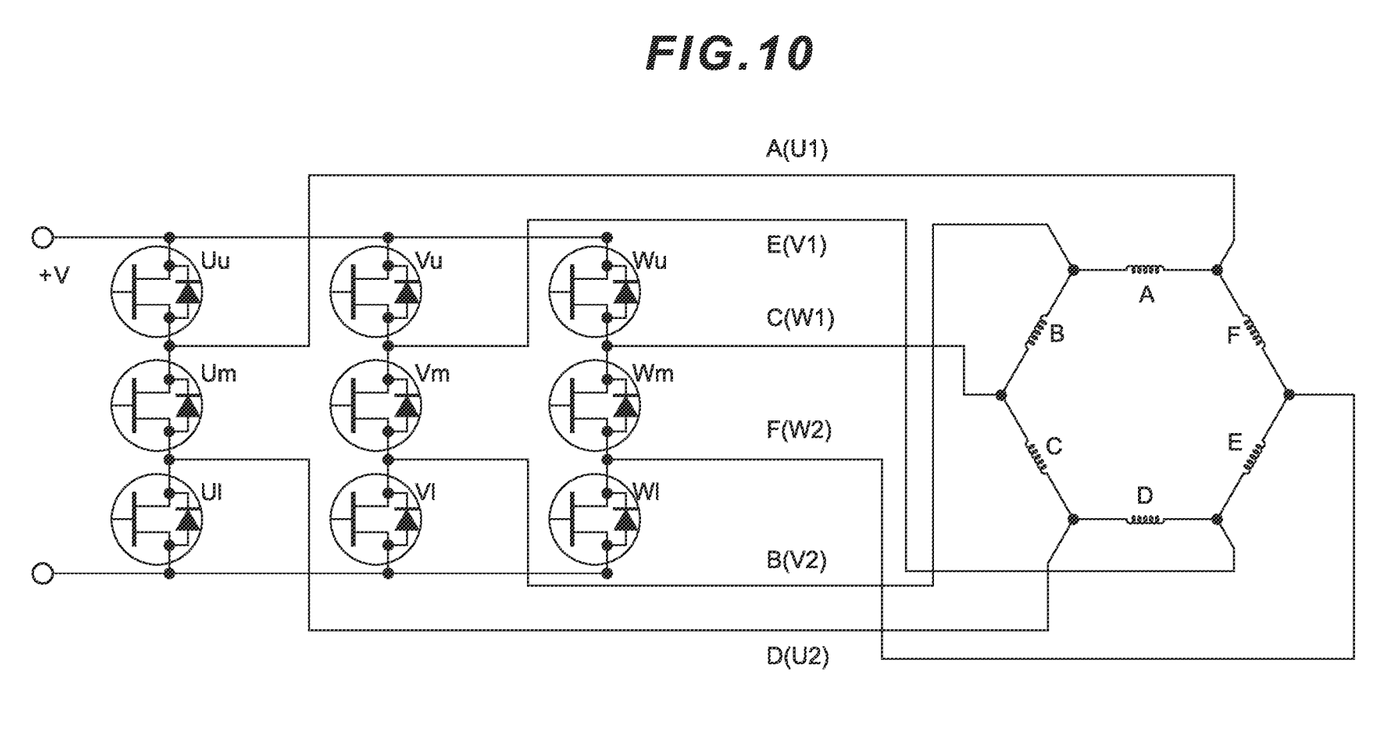
FIG. 10 is a circuit diagram illustrating an outline of a motor apparatus according to a third embodiment.

Next, a third embodiment of the present invention will be described with reference to FIG. 10. Details overlapping with the first embodiment will not be further described. The present embodiment is different from the first embodiment in that the three-phase windings of the first system and the second system are connected by way of a hexagon connection. FIG. 10 is a circuit diagram illustrating an outline of a motor apparatus according to the present embodiment.

As illustrated in FIG. 10, the switch inverter unit of the present embodiment also has three switch groups (U-array switch group, V-array switch group, W-array switch group) connected in parallel between the power supply voltage (+V) and the ground voltage (0 V). Each switch group includes three switches connected in series. A total of nine switches constitutes the switch inverter unit. Each switch has its drain connected to the power supply voltage side (upstream side) and its source connected to the ground voltage side (downstream side).

Further, as illustrated in FIG. 10, the motor unit includes a three-phase winding of the first system composed of three windings (coils) that are the A-phase winding, the E-phase winding, and the C-phase winding, and a three-phase winding of the second system composed of three windings that are the D-phase winding, the B-phase winding, and the F-phase winding. Similar to the first embodiment, one end of each of the A-phase winding, the E-phase winding, the C-phase winding, the D-phase winding, the B-phase winding, and the F-phase winding is connected between each of the switches of the switch inverter unit. Further, the A-phase winding, the B-phase winding, the C-phase winding, the D-phase winding, the E-phase winding, and the F-phase winding are annularly connected in series, to thereby establish a hexagon connection.

Similar to the first embodiment, the motor apparatus of the present embodiment also includes a switch inverter unit that has three switch groups connected in parallel. Each of the switch groups has an upper switch, a middle switch, and a lower switch that are connected in series. In the vector control mode, the switch inverter unit sends a control signal to each of the first and second systems based on three-phase vector control. Thereby, the number of switches can be reduced while individually controlling each phase of the switched reluctance motor having two systems of three-phase windings provided to one rotor.

Further, the on/off signal of the inverter switch unit is determined based on a gate signal by acquiring the current value in each phase of the first system and the second system, calculating the command voltage for each system based on the current value of each phase, and determining the gate signal according to the comparison between the command voltage and the voltage of the carrier wave. Thereby, with the 9-switch inverter, the rotor 11 can be rotated by obtaining the pulse to be applied to the three-phase windings of the two systems and can be efficiently controlled from low speed to high speed according to the driving state.

The present invention is not limited to the above-described embodiments, and various changes can be made within the scope illustrated in the claims, and embodiments obtained by appropriately combining the technical means disclosed respectively in the different embodiments are also included in the technical scope of the present invention.

DESCRIPTION OF THE REFERENCE NUMERALS

10 . . . Motor unit
11 . . . Rotor
12 . . . Stator
13 . . . Teeth part
14 . . . Winding

The invention claimed is:

1. A motor apparatus comprising:
a motor unit including a rotor that is rotatably disposed about an axis of rotation and a stator having an inner periphery on which a plurality of teeth parts is formed;
a switch inverter unit configured to supply electric power to the motor unit; and
a switch control unit configured to control each switch included in the switch inverter unit;
wherein the rotor is formed of a ferromagnetic material and is a switched reluctance motor,
wherein a three-phase winding of a first system and a three-phase winding of a second system are wound around the plurality of teeth parts,
wherein the switch inverter unit includes three switch groups connected in parallel, each of which having an upper switch, a middle switch, and a lower switch that are connected in series between a first potential and a second potential,
wherein the switch control unit has a vector control mode for sending a control signal to each of the first system and the second system of the switch inverter unit based on three-phase vector control,
wherein the vector control mode is configured to generate a pulsed signal by comparing signal waves and carrier waves and perform modulation control on each of the switches by way of PWM (Pulse Width Modulation),
wherein the signal waves have same phases for the first system and the second system and have amplitudes that are offset from one another, and
wherein an amount of the offset is within a range of the amplitudes of one another.

2. The motor apparatus according to claim 1,
wherein an A-phase, an E-phase, and a C-phase are wound around the first system, and a D-phase, a B-phase, and an F-phase are wound around the second system,
wherein the switch inverter unit includes a U-array switch group, V-array switch group, and W-array switch group that are connected in parallel,
wherein the U-array switch group has a first upper switch, a first middle switch, and a first lower switch that are arranged in order from the first potential and connected in series,
wherein the V-array switch group has a second upper switch, a second middle switch, and a second lower switch that are arranged in order from the first potential and connected in series, wherein the W-array switch group includes a third upper switch, a third middle switch, and a third lower switch that are arranged in order from the first potential and connected in series, wherein one end of the A-phase is connected between the first upper switch and the first middle switch, and one end of the D-phase is connected between the first middle switch and the first lower switch, wherein one end of the E-phase is connected between the second upper switch and the second middle switch, and one end of the B-phase is connected between the second middle switch and the second lower switch, and wherein one end of the C-phase is connected between the third upper switch and the third middle switch, and one end of the F-phase is connected between the third middle switch and the third lower switch.

3. The motor apparatus according to claim 2, wherein the A-phase, the B-phase, the C-phase, the D-phase, the E-phase, and the F-phase have another end connected to a neutral point to establish a star connection.

4. The motor apparatus according to claim 2, wherein the A-phase, the B-phase, the C-phase, the D-phase, the E-phase, and the F-phase are annularly connected in series to establish a hexagon connection.

5. The motor apparatus according to claim 1,
wherein the switch control unit has a pulse control mode for pulse-driving the first system and the second system, and
wherein an off signal is sent to the middle switch, the first system is pulse-driven by the upper switch, and the second system is pulse-driven by the lower switch.

6. The motor apparatus according to claim 1, wherein a ratio between the number of poles P of the rotor and the number of slots S of the teeth part is P:S=5:6.

7. A method for driving a motor apparatus that rotates by an output from an inverter switch unit having first and second systems of three-phase windings provided to one rotor, the rotor being formed of a ferromagnetic material and being a switched reluctance motor, the method comprising:
a current value acquisition step that acquires an electric current value of each phase of the first and second systems;
a command voltage calculation step that calculates a first command voltage with respect to the first system and a second command voltage with respect to the second system based on the electric current value of each phase;
a gate signal determination step that determines a gate signal with respect to the first system and the second system by comparing a voltage of a carrier wave with the first command voltage and the second command voltage; and an inverter switch control step that determines an on signal/off signal of the inverter switch unit based on the gate signal;
wherein the first command voltage and the second command voltage have a same phase and have amplitudes that are offset from one another; and
wherein an amount of the offset is within a range of the amplitudes of one another.

8. The motor apparatus according to claim 2,
wherein the switch control unit has a pulse control mode for pulse-driving the first system and the second system, and
wherein an off signal is sent to the middle switch, the first system is pulse-driven by the upper switch, and the second system is pulse-driven by the lower switch.

9. The motor apparatus according to claim 3,
wherein the switch control unit has a pulse control mode for pulse-driving the first system and the second system, and
wherein an off signal is sent to the middle switch, the first system is pulse-driven by the upper switch, and the second system is pulse-driven by the lower switch.

10. The motor apparatus according to claim 4,
wherein the switch control unit has a pulse control mode for pulse-driving the first system and the second system, and
wherein an off signal is sent to the middle switch, the first system is pulse-driven by the upper switch, and the second system is pulse-driven by the lower switch.

11. The motor apparatus according to claim 2, wherein a ratio between the number of poles P of the rotor and the number of slots S of the teeth part is P:S=5:6.

12. The motor apparatus according to claim 3, wherein a ratio between the number of poles P of the rotor and the number of slots S of the teeth part is P:S=5:6.

13. The motor apparatus according to claim 4, wherein a ratio between the number of poles P of the rotor and the number of slots S of the teeth part is P:S=5:6.

14. The motor apparatus according to claim 5, wherein a ratio between the number of poles P of the rotor and the number of slots S of the teeth part is P:S=5:6.

15. The motor apparatus according to claim 8, wherein a ratio between the number of poles P of the rotor and the number of slots S of the teeth part is P:S=5:6.

16. The motor apparatus according to claim 9, wherein a ratio between the number of poles P of the rotor and the number of slots S of the teeth part is P:S=5:6.

17. The motor apparatus according to claim 10, wherein a ratio between the number of poles P of the rotor and the number of slots S of the teeth part is P:S=5:6.

* * * * *